Feb. 17, 1942.   B. H. SMITH   2,273,540
PRESSURE AND TEMPERATURE RESPONSIVE DEVICE
Filed Nov. 18, 1938   2 Sheets-Sheet 1
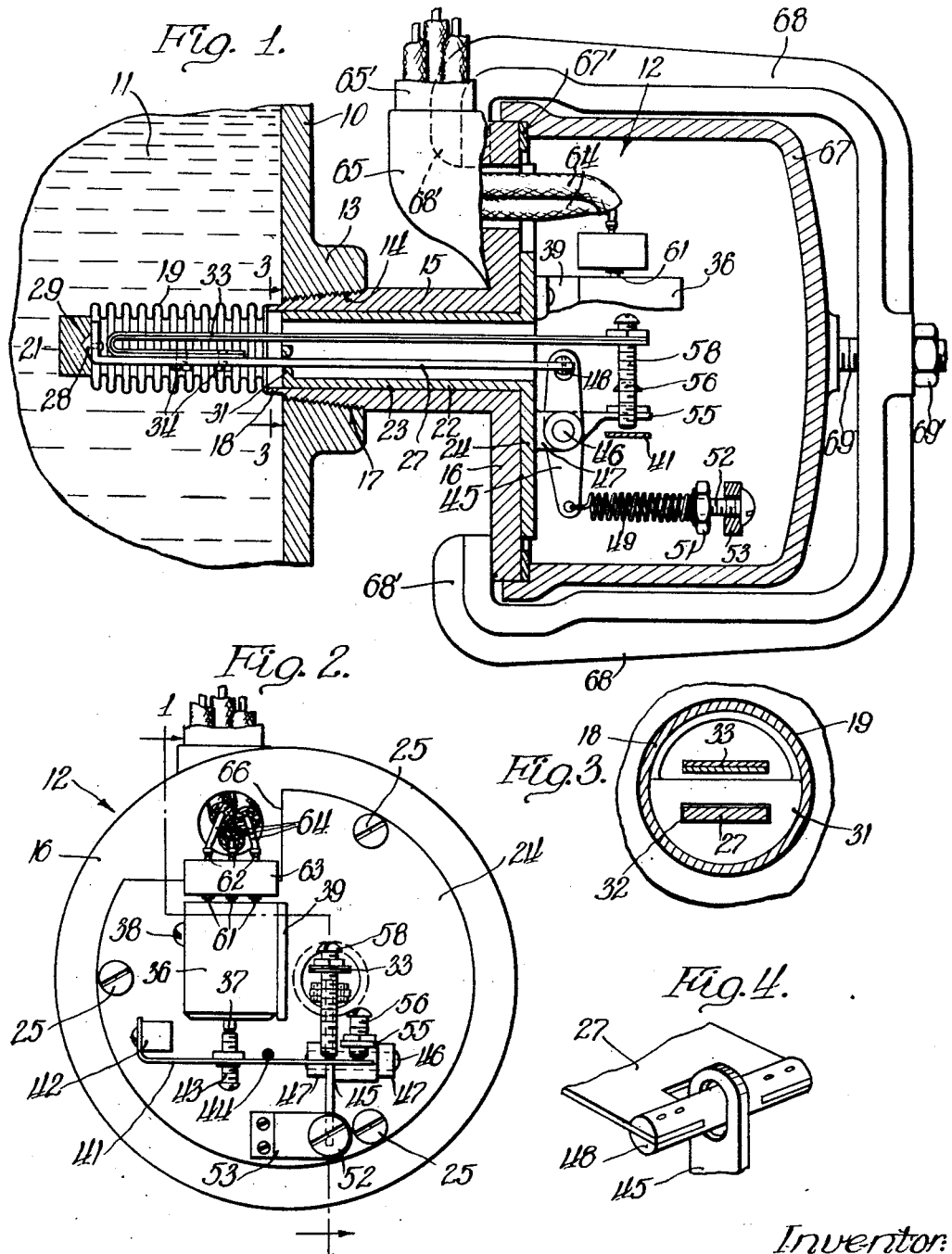
Inventor:
Boyd H. Smith
By Crown, Jackson, Boettcher & Quinn
Attys.

Feb. 17, 1942.  B. H. SMITH  2,273,540
PRESSURE AND TEMPERATURE RESPONSIVE DEVICE
Filed Nov. 18, 1938  2 Sheets-Sheet 2
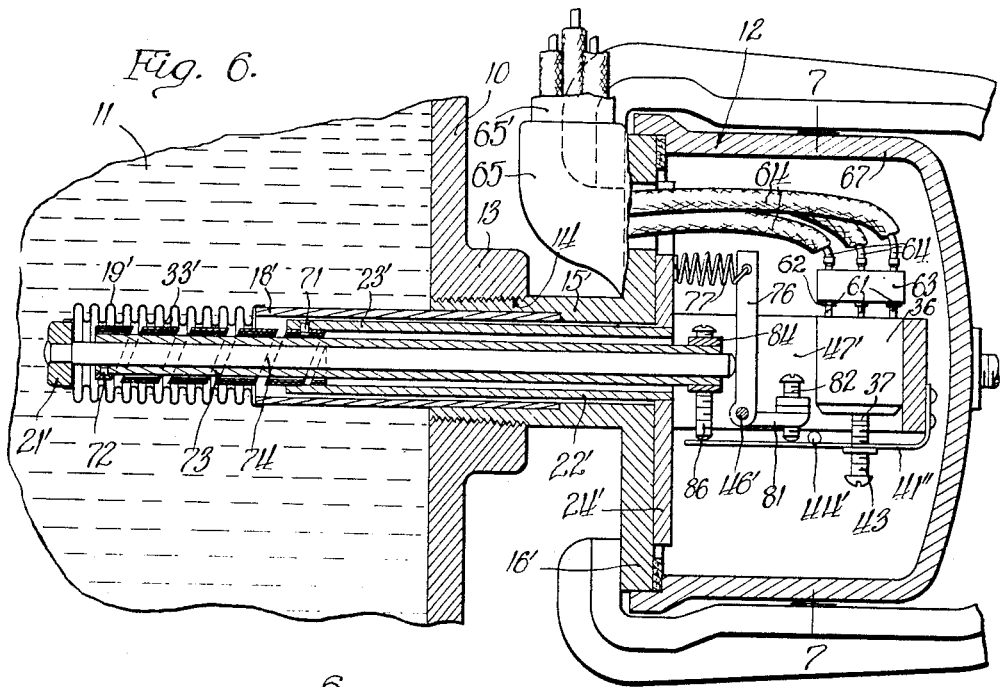
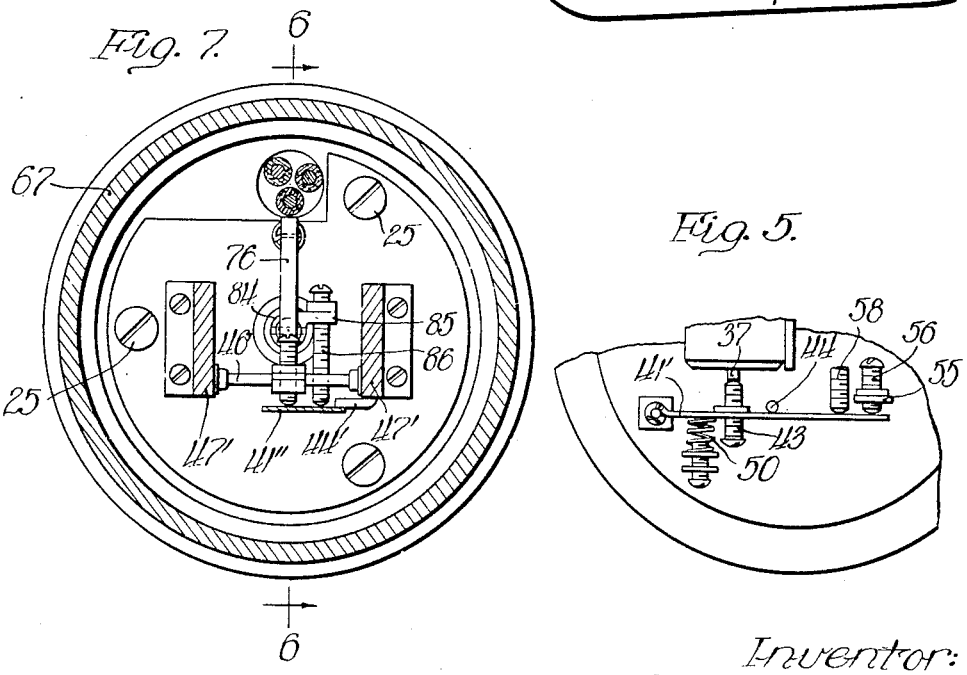
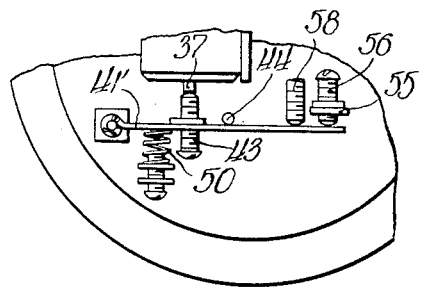
Inventor:
Boyd H. Smith Patented Feb. 17, 1942

2,273,540

UNITED STATES PATENT OFFICE 2,273,540

PRESSURE AND TEMPERATURE RESPONSIVE DEVICE

Boyd H. Smith, Shelby, Ohio, assignor to The Autocall Company, Shelby, Ohio, a corporation of Ohio Application November 18, 1938, Serial No. 241,143

26 Claims. (Cl. 200—83)

The present invention relates generally to pressure and temperature responsive devices and is particularly concerned with pressure and temperature sensitive means arranged to give an indication or perform a control service whenever either pressure or temperature conditions reach a certain value.

While not limited thereto, the principal field of utility of my improved device is in connection with electrical transformers of the oil immersion type. In these transformers, particularly those of large capacity, it is desirable to effect a signal indication in the event that the pressure or the temperature of the oil in the transformer tank should exceed a predetermined maximum. This is accomplished in my improved unit by a flexible element which is responsive to pressure, and by a thermostatic element which is responsive to temperature, these two elements being arranged to actuate switch apparatus which controls a signalling circuit. In order to afford maximum protection to the transformer and associated electrical equipment, it is desirable to check or test the pressure-temperature responsive unit at rather frequent intervals to insure that it is operating properly and is properly calibrated. This is a slow and troublesome procedure when using the prior pressure-temperature units with which I am familiar. It is the customary practice to have the unit mounted in or associated with an opening in the wall of the transformer tank so as to be directly responsive to the pressure and temperature of the oil, and heretofore the removal of the unit for testing has vented the interior of the tank directly to atmosphere through said opening. When the transformer tank is of the type which is maintained full of oil from an overhead breather or oil reserve tank, it is necessary to drain down the oil level in the transformer to a point below the level of the opening in which the pressure-temperature unit is mounted. Likewise, when the transformer tank is of the type in which an inert gas is sealed above the free level of the oil, it is necessary to draw off or vent this gas and then to drain down the oil level to a point below the level of the pressure-temperature unit. In each instance, it is, of course, necessary to cut the transformer out of service, and the performance of the several operations of lowering the oil level, thereafter restoring the proper amount of oil, etc., means that the transformer is out of service for a substantial interval each time that the pressure-temperature unit is checked or calibrated.

This slow and troublesome procedure is avoided by my improved pressure and temperature responsive unit. The construction is such that the pressure responsive element maintains a permanent seal at the opening in which the unit is mounted, whereby the thermostatic element, the switch, and the switch-actuating parts can be removed for inspection and calibration without venting the interior of the tank to atmosphere through said opening. This pressure responsive element is preferably of the expansible and contractible metallic bellows type, one end of which is closed and the other end of which has sealed attachment to the mounting member which mounts the asesmbly in the opening. By virtue of this improved construction, the unit can be checked and calibrated without having to disturb the oil in the tank, or having to vent any inert gas from the tank, and, under some circumstances, the checking may even be performed without cutting the transformer out of service.

Other features, objects and advantages of the invention will appear from the following detail description of two preferred embodiments thereof. In the accompanying drawings illustrating such embodiments:

Figure 1 is a longitudinal sectional view through one form of the device, taken approximately on the plane of the line I—I of Figure 2;

Figure 2 is an outer end view of this construction, with the cover removed;

Figure 3 is a detail sectional view taken approximately on the plane of the line 3—3 of Figure 1;

Figure 4 is a fragmentary detail perspective view;

Figure 5 is a fragmentary detail view of another form of spring loaded switch actuating member;

Figure 6 is a longitudinal sectional view through another form of the device, taken approximately on the plane of the line 6—6 of Figure 7; and Figure 7 is a vertical sectional view taken on the plane of the line 7—7 of Figure 6.

Referring to the embodiment illustrated in Figures 1 to 4, inclusive, the transformer tank or casing is indicated at 10, and the oil contained therein is indicated at 11. The pressure-temperature responsive unit 12 can be mounted in the side, top, or bottom wall of the transformer casing, as desired. At the point of mounting the casing is provided with a boss or nipple 13 through which an opening 14 extends into the interor of the tank, said opening being preferably tapped with a tapered thread. The pressure-temperature unit comprises a mounting member 15 in the form of a tubular stem having a flange or head 16 at its outer end and a tapered thread 17 at its inner end adapted to screw into the threaded opening 14. This is the preferred type of mounting, although it will be understood that the flange or head 16 might be bolted directly to the wall of the tank, with a suitable gasket interposed therebetween to insure a sealed joint.

The mounting member 15 has a reduced stem portion 18 projecting inwardly beyond the threaded portion 17, and secured to this reduced portion by a sealed joint is one end of an expansible and contractible metallic bellows 19, preferably of the type commonly known in the trade as a "Sylphon" bellows. Secured to and sealing the opposite free end of said bellows is an end head or plug 21. Thus, the interior chamber area of the bellows is completely sealed off from the oil 11 within the transformer casing, the bellows being subject, however, to longitudinal contraction and expansion in response to the pressure of this oil.

The parts of the assembly which are adapted to be removed for inspection and calibration are carried on a removable or detachable member 22 comprising a tubular stem portion 23 and an end head or flange 24. The stem portion 23 is adapted to have a snug sliding fit within the bore of the tubular mounting member 15, and the head flange 24 is adapted to be secured to the head flange 16 of said mounting member by screws 25 (Figure 2). The expanding and contracting movement of the bellows 19, responsive to changes of pressure in the oil 11, is transmitted to the switch actuating mechanism through a bar 27 which has reciprocable movement through the stem portion 23. The inner end of said bar is bent at right angles and is provided with a conical seating tip 28 which is adapted to center itself and seat within a conical socket 29 formed in the end plug 21, this arrangement providing a separable connection which facilitates removal of the bar 27. The inner end of the tubular stem 23 is formed with a head or bridge portion 31 which is slotted at 32 (Figure 3) to form a guide for the reciprocatory motion of the bar 27.

The temperature responsive element preferably comprises a bimetallic strip 33 which is disposed substantially within the bellows chamber and extends outwardly through the tubular stem 23, lying above the apertured bridge portion 31. The inner end of said thermostatic strip is preferably anchored to the bar 27, as by bending the latter end of said strip backwardly upon itself and securing this reversely bent leg to the bar 27 by screws 34. By thus extending the thermostatic element substantially the entire length of the bellows chamber the element is disposed in close proximity to the body of oil 11 so as to respond accurately to the temperature of the oil. While I preferably mount the thermostat as shown, it will also be understood that it could be secured to the right angle end portion of the bar 27 carrying the conical centering stud 28, or it might be mounted entirely independently of the bar 27.

The switch, indicated in its entirety at 36, may be of any conventional construction, but preferably is of the three terminal snap action type adapted to close one circuit when the oil 11 attains an abnormal pressure or temperature, and adapted to close another circuit after the operating conditions have been corrected and the oil has returned to a normal pressure and temperature. The particular details of such switch have not been shown because they do not, per se, form any part of the present invention, but, by way of illustrating one typical construction of switch which may be employed, attention is directed to the construction disclosed in McGall Patent No. 1,960,020, and also disclosed in the prior patent of James R. Harrington, No. 2,176,338, issued October 17, 1939. A plunger 37 extending from the switch housing is spring-biased to move outwardly, this plunger being normally pressed inwardly by the switch actuating mechanism for normally maintaining one circuit closed, corresponding to a condition of normal pressure and normal temperature of the oil, but being permitted to move outwardly by the switch actuating mechanism upon the development of an abnormal pressure or temperature in the oil. Such outward movement of the plunger opens the first circuit and closes the second circuit for transmitting an impulse or current flow either for the purpose of giving a signal indication or for effecting a control function intended to restore the transformer or its equipment to a normal condition. The switch housing 36 is suitably secured by screws 38 to a lug or bracket 39 which projects outwardly from the flange portion 24 of the removable member 22.

Referring now to the switch actuating mechanism, such mechanism comprises a spring loaded member which may be in the form of a leaf spring 41, as shown in Figure 2, or in the form of a pivoted lever 41' which is spring loaded by an adjustable spring 50, as shown in Figure 5. Referring to the leaf spring form shown in Figure 2, this spring has one end anchored to a post 42 projecting forwardly from the flange or plate 24, and carries a screw 43 which serves as an adjustable abutment member for imparting motion to the switch plunger 37. Said leaf spring is pre-loaded in such direction that the screw 43 normally presses inwardly against the plunger 37 for normally holding the switch parts in one position. Upward movement of the leaf spring under this preloading is limited by a stop pin 44 projecting outwardly from the head flange 24. The switch parts are spring biased, as above remarked, so that when the leaf spring 41 is flexed downwardly away from the stop pin 44 the plunger 37 is caused to move outwardly for opening the first circuit and closing the second. The switch actuating parts which transmit motion from the reciprocable bar 27 to the leaf spring 41 comprise a two-armed lever 45 which is secured to a pivot shaft 46 journaled in bearing lugs 47 projecting outwardly from the plate 24. The reciprocatory bar 27 is pivotally connected with the upper arm of this lever, as by bifurcating the end of said bar and securing the end portions in the slotted ends of a pivot pin 48 which passes through a vertical slot in the upper arm of the lever (see Figure 4). An adjustable tension spring 49 is connected with the lower arm of said lever. The outer end of said spring is secured to a nut 51 through which threads a screw 52, by the manipulation of which the nut can be shifted inwardly or outwardly to adjust the tension of the spring. The screw 52 is supported in an L-shaped bracket 53 extending outwardly from the plate 24. Secured to the shaft 46 to rotate with the lever 45 is an arm 55 which carries an adjusting screw 56 disposed in position to impart downward movement to the leaf spring 41. This screw is preferably adjusted so that under normal conditions it is spaced slightly from the leaf spring 41. Should an abnormal pressure arise in the oil 11, the resulting contraction of the bellows 19 operates through the rod 27 and lever 45 to rock the arm 55 downwardly for flexing the leaf spring 41 to the other switch actuating position. Adjustment of the tension of the spring 49 and adjustment of the position of the screw 56 enables the apparatus to be set for switch operation at any desired pressure. If the unit is installed in the side of the tank considerably below the upper end thereof, it is usually necessary to adjust these parts to compensate for the "head" of oil above the unit.

The thermostat 33 is so arranged that when the temperature increases to the critical point the strip is caused to bow or flex downwardly. The outer end of the strip carries an adjusting screw 58 which is adapted to engage the leaf spring 41, the lower end of this screw also being normally spaced slightly from the leaf spring. Thus, when the temperature of the oil 11 reaches a predetermined maximum the downward flexing of the thermostatic strip operates through the screw 58 to move the leaf spring 41 to its other switch actuating position. Adjustment of the screw 58 enables the parts to be set to respond to any desired temperature. The leaf spring 41 is relatively wide, or can be made relatively wide directly under the screw 58, so that inward and outward shifting movement of the thermostat 33 occurring with the expansion or contraction of the bellows 19 will not displace the screw 58 to a point where it would not engage the leaf spring 41.

To facilitate removal of the switch and its actuating mechanism for inspection and calibration, the switch is jack connected to the line wires, thereby making it unnecessary to unsolder and resolder the line connections. This jack arrangement comprises three terminal prongs 61 projecting from the switch housing 36 and adapted to engage in three terminal sockets 62 which are mounted in a jack block 63. The three line wires 64 are soldered or otherwise secured to the upper ends of the terminal sockets 62. The conductors 64 enter a conduit nipple 65 which projects as an integral extension from the back side of the mounting member 15, for receiving the conduit 65' as shown in Figure 1. The head flange 24 of the detachable mounting member 22 is notched out as indicated at 66 to permit the passage of the conductors into this conduit nipple. The housing or cover 67 seats against a gasket 67' which bears against the flange 16 of the mounting member. The housing is detachably held in place by a U-shaped clamping yoke 68 which has hook extensions 68' at its ends adapted to hook behind the flange or head 16. A clamping screw 69 threads through the outer end of said yoke and is adapted to exert clamping pressure against the outer end of the cover, being locked by a lock nut 69'. As illustrated in Figure 2, the tubular portions 15 and 23 are eccentrically located with respect to their head flanges 16 and 24, such arrangement enabling the switch and other parts to be grouped more compactly.

When it is desired to remove the pressure-temperature unit for testing and calibration, the cover 67 is first removed and then the jack block 63 is pulled off the terminal prongs 61. Thereupon, by releasing the screws 25, the removable member 22 together with all parts carried thereby can be readily separated from the mounting member 15. The reciprocatory bar 27 and the thermostat 33 are thus withdrawn from the interior of the bellows 19, the latter remaining in the position of a permanent seal for preventing discharge of the oil 11 out through the opening 14 or mounting member 15. The removed unit may then be placed in a portable calibrating apparatus which simulates the actual installation, and the desired checking operations performed. In the replacement of the unit, the conical stud 28 enters the conical socket 29 in the inner end of the bellows and properly locates the bar 27 and thermostat 33. The removal of the unit, its inspection and calibration, and the replacing thereof can all be done without disturbing the transformer operation and without changing any of the conditions within the transformer tank.

Referring now to the embodiment illustrated in Figures 6 and 7, in this construction the thermostat is in the form of a helically coiled bimetallic strip 33' which is adapted to produce rotary motion in one direction and then the other with increase and decrease of temperature. The outer end of said coiled strip is anchored by a rivet 71 to the end of the tubular stem portion 23' of the removable element 22'. The inner end of the thermostat is secured by a rivet 72 to a sleeve 73 which is caused to rotate by the expansion and contraction of the thermostat. The inward and outward flexure of the bellows 19' is imparted to a reciprocable rod 74 which has its inner end riveted to the head 21' of the bellows and which extends axially through the rotatable sleeve 73. The fixed end of the bellows 19' is sealed to an extension tube 18' which is secured fast within the tubular mounting member 15'.

The switch actuating mechanism comprises substantially the same arrangement of spring loaded member previously described, except that in this instance such member extends substantially parallel to the tubular mounting member. This spring loaded member may take the form of a leaf spring 41'', as shown in Figure 6, or it may take the form of a pivoted lever loaded by an adjustable spring, substantially as shown in Figure 5. The reciprocatory motion of the bellows actuated rod 74 is imparted to a lever arm 76 mounted on the pivot shaft 46', said pivot shaft being journaled in bearing plates or lugs 47' which project forwardly from the flange portion 24' of the removable element. A tension spring 77, which may be made adjustable if desired, is connected between the upper end of the lever 76 and the flange portion 24', this spring holding the lever against the end of the rod 74. Extending from the shaft 46', or from the lever 76, is a lever arm 81 which carries an adjustable screw 82 adapted to bear against the top of the leaf spring 41''. Thus, contraction of the bellows under an abnormal pressure in the oil actuates the lever arms 76 and 81 to depress the leaf spring 41'' and operate the switch 36. The leaf spring 41'' is pre-loaded so as to normally bear upwardly against the stop pin 44', and the screw 82 is preferably adjusted to be disposed slightly out of contact with the leaf spring, as previously described. The switch is conveniently mounted on one or both side brackets 47'.

With reference to the thermostat 33', the projecting outer end of the rotatable sleeve 73 has a hub member 84 clamped thereto or formed integral therewith, and extending from this hub member is an arm 85. Threading down through this arm is an adjustable screw 86 which is adapted to bear against the top of the leaf spring 41'', this screw preferably being adjusted slightly out of contact with said leaf spring. Thus, the development of an abnormal temperature in the oil causes the thermostatic strip 33' to rotate the sleeve 73 and depress the screw 86, thereby flexing the leaf spring 41'' downwardly and causing operation of the switch. The arrangement of the other parts of the assembly will be obvious from the preceding description. In the removal of the unit for inspection and calibration, the thermostatic strip 33' and the rotatable sleeve 73 are withdrawn endwise over the reciprocatory rod 74. If desired, this rod might also be arranged to be removed with the other parts, but such is not necessary because the rod can be duplicated or simulated in the portable testing apparatus.

In each of the embodiments above described, the force transmitted by the bellows is operative to actuate the switch in response to pressure, and the force transmitted by the thermostat is operative to actuate this same switch in response to temperature. Under some relations of temperature and pressure, these two forces will act cumulatively to operate the switch. Where a substantial range of cumulative operation is desired, such can be obtained by making appropriate adjustments of the calibrating screws 43, 52, 56, 58, 82 and 86 and also of the pressure of the spring 50 (Figure 5). Thus, if both pressure and temperature rise substantially simultaneously at certain rates, their effect on the switch can be made cumulative in that the switch will then be caused to act at a point below the critical pressure and below the critical temperature. This is often desirable, since a combination of dangerous pressure and dangerous temperature is sometimes more hazardous than a higher point of either condition alone.

While I have illustrated and described what I regard to be the preferred embodiments of my invention, nevertheless it will be understood that such are merely exemplary and that numerous modifications and rearrangements may be made therein without departing from the essence of the invention. In this regard, although the invention appears to have its primary field of utility in connection with electrical transformers of the oil immersion type, it will be understood that the invention is also applicable to other situations characterized by an enclosure containing a fluid, the pressure and temperature of which it is desired to place under signal supervision or have otherwise arranged for performing a circuit controlling function.

I claim:

1. In pressure and temperature responsive apparatus for transformer tanks and the like, the combination of a member associated with an opening in the tank and responsive to the pressure therein, said member serving to seal said opening closed, another member also associated with said opening and responsive to the temperature within said tank, and switch means actuated by said pressure and temperature responsive members, said temperature responsive member and said switch means being removable from said tank without disturbing the sealing function of said pressure responsive member.

2. In a pressure and temperature responsive apparatus for transformer tanks and the like, the combination of an expansible and contractible member associated with an opening in the tank and responsive to the pressure therein, said member serving to seal said opening closed against communication with atmosphere, a member responsive to the temperature within said tank through said opening, and switch means actuated by said pressure and temperature responsive members, said temperature responsive member and said switch members being removable from said tank without disturbing the sealing function of said pressure responsive member.

3. In a pressure and temperature responsive device for transformer tanks and the like, the combination of a bellows sealing an opening in the tank and responsive to the pressure therein, a thermostat arranged to respond to the temperature within said tank through said opening, and switch means adapted to be actuated by said bellows or by said thermostat or both, the device being arranged whereby said thermostat and said switch means can be removed for inspection or testing without disturbing the sealing function of said bellows.

4. In a circuit controlling device responsive to pressure and temperature conditions within a transformer tank or the like, the combination of a tubular mounting member associated with an opening in said tank, a bellows carried by said mounting member and responding to pressure conditions within said tank, said bellows serving to seal said opening against communication with atmosphere, a thermostat disposed within said bellows and responding to temperature conditions within said tank, and switch means adapted to be actuated by said bellows and by said thermostat, the device being arranged whereby said thermostat and said switch means can be removed from the assembly without disturbing the sealing function of said bellows.

5. In a circuit controlling device responsive to pressure and temperature conditions within a transformer tank or the like, the combination of a tubular mounting member associated with an opening in said tank, a bellows carried by said mounting member and responding to pressure conditions within said tank, said bellows serving to seal said opening against communication with atmosphere, a thermostat disposed within said bellows and responding to temperature conditions within said tank, switch means, and actuating mechanism adapted to be actuated by said bellows and by said thermostat for transmitting motion to said switch means, the device being constructed and arranged whereby said thermostat, said switch means, and said actuating mechanism can be removed from the assembly without disturbing the sealing function of said bellows.

6. In a circuit controlling device responsive to pressure and temperature conditions within a transformer tank or the like, the combination of a tubular mounting member extending into an opening in said tank, a pressure responsive bellows secured to the inner portion of said mounting member and disposed substantially within the tank, said bellows establishing a sealed closure between the interior of the tank and atmosphere through said tubular mounting member, a bimetallic thermostat within said tubular mounting member responding to temperature conditions within said tank, and switch means adapted to be actuated by said bellows and by said thermostat, the device being arranged whereby said thermostat and said switch means can be removed from the tank without disturbing the sealing function of said bellows.

7. In a circuit controlling device responsive to pressure and temperature conditions within a transformer tank or the like, the combination of a bellows extending into said tank to respond to pressure conditions therein, a bimetallic thermostatic strip disposed in heat absorbing relation to the interior of the tank so as to be responsive to temperature conditions within said tank, a switch, and switch actuating mechanism adapted to be actuated by said bellows and by said thermostatic strip for transmitting motion to said switch, said device being constructed and arranged whereby when said bellows and said thermostatic strip are simultaneously subjected to rising pressure and rising temperature respectively they are capable of transmitting their switch actuating forces cumulatively to said switch actuating mechanism.

8. In a circuit controlling device responsive to pressure and temperature conditions within a transformer tank or the like, the combination of a bellows operatively arranged to respond to pressure conditions within said tank, a bimetallic thermostatic strip disposed in heat absorbing relation to the interior of the tank so as to be responsive to temperature conditions within said tank, and a switch adapted to be actuated by said bellows and by said thermostatic strip, said bellows, thermostatic strip and switch being so constructed and arranged that when said bellows and said thermostatic strip are subjected to rising pressure and rising temperature respectively they are capable of a cumulative effect in the transmission of motion to said switch.

9. In a circuit controlling device responsive to conditions within an enclosure, the combination of a pressure responsive element operatively arranged to respond to pressure within the enclosure, a thermal element operatively arranged to respond to temperatures transmitted from the interior of said enclosure through said pressure responsive element, and switch means adapted to be actuated by said elements, said elements being operative upon rising pressure and rising temperature to transmit switch actuating forces in the same direction to said switch means.

10. In a circuit controlling device responsive to conditions within an enclosure, the combination of a pressure responsive element responsive to pressure within the enclosure, a thermally responsive element operatively arranged to respond to temperatures transmitted from the interior of said enclosure through said pressure responsive element, and switch means adapted to be actuated by said elements, said elements being operative to transmit switch actuating forces responsive to pressure rise and responsive to temperature rise cumulatively to said switch means.

11. In a circuit controlling device responsive to pressure and temperature conditions within a transformer tank or the like, the combination of a bellows disposed substantially within said tank and responsive to pressure conditions therein, a thermostat disposed substantially within said bellows and responsive to temperature conditions in said tank, and switch means disposed outside of said tank and arranged to be mechanically actuated by said bellows and by said thermostat.

12. In a circuit controlling device responsive to pressure and temperature conditions within a transformer tank or the like, the combination of a bellows disposed substantially within said tank and responsive to pressure conditions therein, a thermostat disposed substantially within said bellows and responsive to temperature conditions in said tank, and switch means arranged to be actuated by said bellows and by said thermostat.

13. In circuit controlling apparatus responsive to conditions within an enclosure, the combination of an expansible and contractible chamber disposed substantially within said enclosure and responsive to pressure conditions therein, thermally responsive means substantially enclosed by said expansible and contractible chamber and responsive to temperature conditions within said enclosure, and circuit controlling means actuated by said expansible and contractible chamber and by said thermally responsive means.

14. In circuit controlling apparatus responsive to temperature and pressure conditions within an enclosure, the combination of a tubular mounting member associated with an opening in said enclosure, a bellows at the inner end of said tubular member, switch means at the outer end of said tubular member, a reciprocable member transmitting motion from said bellows through said tubular member to said switch means, and a thermostat disposed substantially within said bellows and arranged to actuate said switch means through said tubular member.

15. In circuit controlling apparatus responsive to temperature and pressure conditions within an enclosure, the combination of a tubular mounting member associated with an opening in said enclosure, a bellows at the inner end of said tubular member, a thermostat disposed substantially within said bellows, switch means at the outer end of said tubular member, a spring loaded member for operating said switch means, a reciprocable member transmitting motion from said bellows through said tubular member, lever means transmitting motion from said reciprocable member to said spring loaded member, and means for transmitting motion from said thermostat to said spring loaded member.

16. In circuit controlling apparatus responsive to temperature and pressure conditions within an enclosure, the combination of a tubular mounting member associated with an opening in said enclosure, a bellows at the inner end of said tubular member, switch means at the outer end of said tubular member, a spring loaded member for operating said switch means, a reciprocable member transmitting motion from said bellows through said tubular member, lever means transmitting motion from said reciprocable member to said spring loaded member, a bimetallic thermostatic strip having a reversely bent inner end secured to said reciprocable member, said thermostatic strip adapted to flex laterally within said tubular member, and means actuated by the outer end of said thermostatic strip for transmitting motion to said spring loaded member.

17. In a circuit controlling apparatus responsive to temperature and pressure conditions within an enclosure, the combination of a tubular mounting member associated with an opening in said enclosure, a bellows at the inner end of said tubular member, a switch means at the other end of said tubular member, a spring loaded member for operating said switch means, a reciprocable member transmitting motion from said bellows through said tubular member, lever means transmitting motion from said reciprocable member to said spring loaded member, a helically coiled bimetallic thermostatic strip disposed substantially within said bellows and having one end anchored to said tubular member, a rotatable member secured to the other end of said thermostatic strip and extending outwardly through said tubular member for rotation by said thermostatic strip, and means for transmitting motion from said rotatable member to said spring loaded member.

18. In a circuit controlling device responsive to pressure conditions within a transformer tank or the like, the combination of a tubular mounting member associated with an opening in said tank, a bellows carried by said mounting member and extending into said tank to be responsive to pressure conditions therein, a thermostat associated with said mounting member and arranged to respond to temperature conditions within said tank, said bellows serving to seal said opening against communication with atmosphere, adjustable spring means for imposing a continuous adjustable spring pressure on said bellows and switch means arranged to be actuated by said bellows and by said thermostat, said switch means being detachably associated with said mounting member, whereby it can be removed from the assembly for calibration without disturbing the sealing function of said bellows.

19. In a circuit controlling device responsive to temperature conditions within a transformer tank or the like, the combination of a tubular member associated with an opening in said tank and extending therethrough into the tank, said tubular member serving to seal the interior of the tank against communication with atmosphere through said opening, a coiled thermostat disposed within said tubular member to extend into the tank, and switch means arranged to be actuated by said thermostat, said switch means being detachably associated with said tubular member, whereby it can be removed from the assembly for calibration without disturbing the sealing function of said tubular member.

20. In pressure and temperature responsive apparatus for a transformer tank or the like, the combination of a tubular mounting member associated with an opening in the tank, a bellows carried by said mounting member and responding to pressure conditions within said tank, a thermostat associated with said bellows and responding to temperature conditions within said tank, switch means adapted to be actuated either by said bellows or by said thermostat, a removable housing for enclosing said switch means, and a U-shaped clamp engaging said mounting member and operative to releasably secure said housing thereto.

21. In a pressure and temperature responsive unit for transformer tanks and the like, the combination of a tubular mounting member adapted to have connection with an opening in the tank, a bellows carried by said mounting member and disposed within said tank, temperature responsive means comprising a bimetallic strip responsive to the temperature in said tank transmitted through said bellows, and switch means adapted to be actuated by said bellows and by said temperature responsive means.

22. A pressure and temperature responsive device comprising a supporting member including a tubular mounting member adapted to be connected with an opening in a casing, a movable member carried by said supporting member, an expansible bellows carried at the inner end of said tubular mounting member with its exterior surface exposed to the pressure in said casing, said bellows including a shiftable head member, an actuating part extending through said tubular mounting member and movable with said head member axially in said tubular mounting member for controlling the position of said movable member, and temperature responsive means arranged to respond to temperatures transmitted from the interior of said tank through said bellows and operative to also control the position of said movable member.

23. A pressure and temperature responsive device comprising a supporting member including a tubular mounting member adapted to be connected with an opening in a casing, a movable member carried by said supporting member, an expansible bellows carried by said tubular mounting member and disposed inside said casing with its exterior surface exposed to the pressure in said casing and including a shiftable head member, a first actuating part extending through said tubular mounting member and movable with said head member, said first actuating part controlling the position of said movable member, temperature responsive means extending into said bellows, and a second actuating part responsive to said temperature responsive means for also controlling the position of said movable member.

24. In pressure and temperature responsive apparatus for transformer tanks and the like, the combination of switch means, a pressure responsive bellows having its exterior surface exposed to the pressure within said tank, operating means responsive to said bellows and arranged to actuate said switch means to a predetermined circuit controlling position when the pressure within said tank rises to a predetermined point, temperature responsive means arranged to respond to temperatures transmitted from the interior of said tank through said bellows, and operating means responsive to said temperature responsive means and arranged to actuate said switch means to said same predetermined circuit controlling position when the temperature in said tank rises to a predetermined point.

25. In pressure and temperature responsive apparatus for transformer tanks and the like, the combination of switch means, a pressure responsive bellows extending into said tank to respond to the pressure within said tank and connected to actuate said switch means to a predetermined circuit controlling position when the pressure in said tank rises to a predetermined point, and temperature responsive means responsive to the temperatures transmitted from within said tank through the walls of said bellows and connected to actuate said switch means to said same predetermined circuit controlling position when the temperature in said tank rises to a predetermined point.

26. In a pressure and temperature responsive unit for transformer tanks and the like, the combination of a pressure responsive bellows associated with an opening in the tank and having its exterior surface exposed to the pressure within said tank, a thermal element extending into said bellows to respond to rising temperatures conducted from within said tank through the walls of said bellows, switch means, and switch operating means responsive to said bellows for moving said switch means to a predetermined circuit controlling position when the pressure in said tank rises to a predetermined point, and also responsive to said thermal element for moving said switch means to the same predetermined circuit controlling position when the temperature in said tank rises to a predetermined point, said switch operating means being constructed and arranged so as to be operative upon rising pressure and rising temperature to transmit switch actuating forces cumulatively to said switch means.

BOYD H. SMITH.